3,712,912
PROCESS FOR PREPARING ACRYLONITRILE
Arnold Hausweiler, Zons, and Gunter Beilstein, Adolf Mayer, and Nikolaus Paris, Dormagen, Germany, assignors to Erdolchemie Gesellschaft mit beschrankter Haftung, Cologne, Germany
No Drawing. Filed Feb. 17, 1971, Ser. No. 116,238
Claims priority, application Germany, Apr. 24, 1970,
P 20 19 996.6
Int. Cl. C07c *121/02, 121/32*
U.S. Cl. 260—465.3                                6 Claims

ABSTRACT OF THE DISCLOSURE

Acrylonitrile is prepared by reacting propylene, ammonia, and molecular oxygen or air, on a supported catalyst having a specific surface area of from 5 to 30 m.$^2$/g., and containing more than 50% by weight carrier, 6 to 26% by weight bismuth, 2 to 20% by weight molybdenum, 0.5 to 10% by weight iron, and optionally 0.1 to 1% by weight of phosphorus. The reaction gas mixture is free of steam and the reaction is carried out at a temperature of 400 to 500° C. under pressure of 1 to 4 atmospheres for a period of 5 to 15 seconds. In addition an oxygen concentration of less than 1 volume percent is maintained in the gaseous reaction product mixture.

---

The invention relates to the preparation of acrylonitrile from propylene, ammonia and either oxygen or air at elevated temperature and under normal or elevated pressure in the presence of supported catalysts.

It is already known to produce acrylonitrile by reacting propylene with ammonia and oxygen or air in the presence of supported catalysts which contain bismuth, molybdenum and phosphorus (see German Pat. No. 1,127,351) or iron, bismuth, molybdenum and phosphorus (see German Pat. No. 1,243,175). The process is used mainly for producing acrylonitrile on a large industrial scale with the aid of bismuth-phosphorus molybdate supported catalysts (see Petroleum Refiner, No. 11, November 1962, Volume 41, page 188 and Volume 42, No. 11, November 1963, page 139; Chemical Week, January 28, 1961, page 39 and Technical Week, Aug. 16, 1968, page 28).

The processes disclosed in German Pats. Nos. 1,127,351 and 1,243,175 require, however, the presence of steam as a diluent in the starting gas in order to achieve the desired conversion rates and yields.

It has now been found that acrylonitrile can be prepared especially advantageously by reacting propylene with ammonia and molecular oxygen or air on a supported catalyst containing bismuth, molybdenum, iron and phosphorus at elevated temperature and under normal or elevated pressure if the reaction is carried out under the following conditions: The carrier catalyst contains 6 to 26% by weight of bismuth, 2 to 20% by weight of molybdenum, 0.5 to 10% by weight of iron, and optionally 0.1 to 1.0% by weight of phosphorus, and the quantity of carrier amounts to 50 to 87% by weight of the total catalyst and the specific surface area of the catalyst is 5 to 30 m.$^2$/g.; the gas which contains propylene, ammonia and oxygen or air is free from steam as diluent; the reaction is carried out at a temperature of between about 400° C. and 500° C., and under a pressure of between about 1 and about 4 atmospheres; the reaction is carried out for about 5 to 15 seconds, and an oxygen concentration of less than one volume percent is maintained in the gaseous reaction product mixture.

The catalyst suitable for the process according to the invention may be prepared by numerous known processes. If it is to be used in a solid bed reaction, the various components should all be precipitated together and the catalyst mass should be ground up and formed into pills or spheres. If desired, the preformed carrier may be impregnated with the aqueous solution of active substances. If the catalyst is to be used in a fluidised bed, it is advantageously prepared by spray drying a solution or gel of the active substances and of the carrier, but fluidised bed catalysts may also be prepared by reacting the spheres with the solution of active substances. In all cases, the shaped and dried catalysts are finally heat-treated to obtain the surface according to the invention. The carrier used for the catalytically active substances is preferably silicon dioxide, but silicon carbide may also be used.

For example, a silica gel which has been prepared in a spray drier and which has a specific surface of e.g. 350 m.$^2$/g. may be impregnated with a solution of the metal salts and then dried and calcined, but alternatively, the solutions of metal salts may be mixed with a silica sol having a concentration of 30 to 40%. This sol is then granulated in a spray drier and calcined. The impregnation of preformed silica gel particles with solutions of the metal salts may be preferable to the spray granulation of a mixture of silica sol and metal salts because it requires only low concentrations of active substance and no active substance is encapsulated by silica gel and thereby rendered inaccessible to the catalytic reaction.

The amount of catalytically active metals and optionally of phosphorus in the carrier catalyst may vary within the limits indicated. The total amount of active substance may be 13 to 50 percent by weight of the total catalyst. The amounts of active substances preferably present in the catalyst for the process according to the invention are shown in the following table.

TABLE I

| Active substance | Mo | Bi | Fe | P |
|---|---|---|---|---|
| Percentage by weight | 7 | 7 | 2 | 0.3 |
| Do | 16 | 14 | 4 | 0.5 |
| Do | 13 | 23 | 2 | 0.5 |
| Do | 18 | 14 | 7 | 0.5 |

In order to obtain a catalyst having a specific surface area of 5 to 30 m.$^2$/g. and preferably 8 to 20 m.$^2$/g., the catalyst is heated for 0.5 to 20 hours, preferably 3 to 5 hours, at a temperature of from about 580° C. to about 800° C., preferably at about 650° C. to 750° C.

It must be regarded as distinctly surprising that the catalyst activity is increased by the treatment at such temperatures and that, when the process is carried out in accordance with the invention in the absence of steam as a diluent in the starting mixture, and with an oxygen content in the reaction product mixture of less than 1 volume percent, preferably 0.1 to 0.4 volume percent, yields of acrylonitrile of up to 74%, based on the propylene used, are achieved, which are higher than any acrylonitrile yields that have hitherto been achieved when using catalysts which contain molybdenum, bismuth, iron and phosphorus.

The process according to the invention may be carried out in a fluidised bed or a solid bed. The fluidized bed reaction is generally preferred. In this case, a catalyst having a particle size of from about 10$\mu$ to about 120$\mu$ is used.

As a modification of the catalyst preparation the aqueous solution of active substances used in the preparation may contain carboxylic acids, preferably oxalic acid or citric acid.

To carry out the reaction according to the invention, propylene, ammonia and either oxygen or air are brought into contact with the carrier catalyst in known manner at a temperature of between about 400° C. and 500° C., preferably at a temperature of between about 440° C. and 490° C., and under a pressure of from 1 to 3 atmospheres, but, in contrast to the usual method of carrying out the process, no steam or other diluent is added to the starting gases with the exception of nitrogen in cases where air is used as the gas which contains oxygen. The reaction temperatures employed are preferably between about 450° C. and 470° C. and the pressures are preferably between 1.5 and 2.5 atmospheres. The periods of stay are between 5 and 15 seconds, preferably 8 to 12 seconds. The oxygen content of the reaction gas product mixture is constantly controlled with the aid of a suitable analysis apparatus, and is maintained at a concentration of a maximum of 1 volume percent, preferably at 0.1 to 0.4 volume percent, by suitably regulating the quantity of oxygen or air introduced into the reaction.

A molar ratio of air to propylene to ammonia of 9.5 to 10:1:1 to 1.1 is generally suitable for the starting gas mixture in order to achieve the concentration of oxygen in the reaction gas product mixture required according to the invention. The yield of acrylonitrile is up to 74%, based on the amount of propylene put into the reaction. On account of this yield of acrylonitrile, which has hitherto not been obtained with any catalysts containing molybdenum, bismuth, iron and phosphorus, the process according to the invention is of considerable economic importance, especially for the synthesis of acrylonitrile on a large industrial scale. Apart from the increased acrylonitrile yields, another advantage of the process according to the invention is that the oxygen or air requirement is less and the reactor can be more heavily loaded.

EXAMPLE 1

(a) 280 g. of $Fe(NO_3)_3 \cdot 9H_2O$ are dissolved in a nitric acid solution consisting of 330 g. of $Bi(NO_3)_3 \cdot 5H_2O$, 120 ml. of $H_2O$ and 84 g. of $HNO_3$ (65%). 50 ml. of $H_2O_2$ (30% by weight) are stirred in at 25° C. with cooling. 340 g. $(NH_4)_6 \cdot Mo_7O_{24} \cdot 4H_2O$ and 18.6 g. of $NH_4HPO_4$ are dissolved in 250 ml. of $H_2O_2$ (30% by weight), also with cooling. The solution which contains molybdenum is then stirred into the solution which contains iron and bismuth at 25° C. with cooling. The clear, red-brown solution is now mixed with 500 g. of an $SiO_2$ carrier with a particle size of 0.01 to 0.1 mm., and the resulting paste is dried at 120° C. and then calcined at 700° C. for 6 hours. The catalyst then has a specific surface area of 10 to 15 m.²/g. It contains 49 to 50 percent by weight of active substances in the form of oxides. The bulk density is 0.6 g./ml.

(b) 720 ml. of this catalyst are introduced into a fluidised bed reactor having a diameter of 40 mm. A mixture of air, propylene and ammonia in the molar ratio of air to propylene to ammonia of 9.5 to 10:1:1 to 1.1 is introduced at 456° C. to 460° C., and an excess pressure of 0.4 atmosphere is constantly maintained at the head of the reactor. The reaction gases are passed through a cold 0.1 solution of HCl in which all the reaction products are absorbed and in which they can be determined by chromatography. The oxygen content of the reaction product gases should be from 0.1 to 0.3 volume percent and is constantly controlled by gas chromatography. Deviations from the required oxygen value are corrected by altering the amount put into the reaction. The results obtained are shown below in relation to the charge:

| Catalyst volume (ml.) | Carbon in the gas used as starting material (g./hour) | Acrylonitrile yield (percent based on the amount of propylene put into the reaction) |
|---|---|---|
| 720 | 15 | 72 |
| 720 | 20 | 73 |
| 720 | 25 | 70 |

EXAMPLE 2

Catalysts containing various amounts of bismuth, molybdenum, iron and phosphorus are prepared as in Example 1 and tested as described there. The following results are obtained:

| Catalyst composition (percent by weight) | Carbon in the gas used as starting material (g./hour) | Acrylonitrile yield (percent based on the amount of propylene put into the reaction) |
|---|---|---|
| 7% molybdenum, 7% bismuth, 2% iron, 0.3% phosphorus | 20 | 68.7 |
| 13% molybdenum, 23% bismuth, 2% iron, 0.5% phosphorus | 20 | 71 |
| 16% molybdenum, 14% bismuth, 4% iron | 20 | 69 |

EXAMPLE 3

1000 g. of a catalyst which was in use for about 14,000 hours in an acrylonitrile plant and which contains 22.5% by weight of bismuth, 13.5% by weight of molybdenum and 0.3% by weight of phosphorus on $SiO_2$ as catalyst carrier and which provided an acrylonitrile yield of 57% at a specific surface of 41 m.²/g. are impregnated with a solution of 72.3 g. of $Fe(NO_3)_3 \cdot 9H_2O$, 20 g. of $HNO_3$ (65%) and 15 ml. of $H_2O_2$ (30 percent by weight) in 400 ml. of water, dried at 120° C. and heated at 700° C. for 4 hours. The surface area is then 8 to 12 m.²/g. and the bulk density 0.96 to 1.0 g./ml. The catalyst obtained in this way is used as in Example 1(b) for converting air, propylene and ammonia into acrylonitrile. The charge was 20 g. of carbon per hour per 720 ml. of catalyst, the temperature employed was 460° C., the pressure at the head of the reactor 0.4 excess atmosphere, and the molar ratio of air to propylene to ammonia was 9.5:1:1.1. The acrylonitrile yield is 69.1%.

EXAMPLE 4

A solution of active substance in accordance with Example 1(a) is mixed with an amount of 40% by weight silica sol such that the proportion of metal oxides and phosphorus oxides in the finished calcined catalyst is 45% by weight of the total mass. This mixture is granulated in a spray drier and then calcined at 700° C. for 4 hours. The bulk density of the resulting catalyst is 0.91 g./ml. and the surface area 14 m.²/g. The catalyst used for the synthesis of acrylonitrile was tested as in Example 1(b) and provided a yield of 70.7% of acrylonitrile.

EXAMPLE 5

150 g. of oxalic acid are dissolved in a solution of 157.3 g. of $(NH_4)_6Mo_7O_{24} \cdot 4H_2O$ and 250 ml. of water at 40° C., and 100 g. of $HNO_3$ (65% by weight) are then added with stirring.

169.5 g. of $Bi(NO_3)_3 \cdot 5H_2O$ are dissolved in a solution of 151.9 g. of $Fe(NO_3)_3 \cdot 9H_2O$, 9.3 g. of $NH_4H_2PO_4$ and 250 g. of $HNO_3$ (65% by weight) at 40° C.

The two solutions are rapidly poured together at 25° C. 755 g. of spherical particles of silica gel having a specific surface area of 120 m.²/g. are impregnated with the resulting clear solution, dried at 120° C., heated at 700° C. for one hour and then calcined at 700° C. for 4 hours. The catalyst was tested by the same method as in Example 1(b) and provided an acrylonitrile yield of 70.2%.

EXAMPLE 6

1000 g. of the used catalyst described in Example 3, containing bismuth, molybdenum and phosphorus as active substances, are impregnated with a solution prepared from 217 g. of $Fe(NO_3)_3 \cdot 9H_2O$, 100 g. of oxalic acid, 115 g. of $HNO_3$ (65% by weight) and 150 to 200 ml. of water, dried at 120° C. and heated at 700° C. for 4 hours. The specific surface area is 8 to 10 m.²/g. The catalyst for acrylonitrile synthesis is as in Example 1(b). At a temperature of 465° C., under a pressure at the head of the reactor of 0.4 excess atmosphere and with a molar ratio of air to propylene to ammonia of 9.5:1:1.1, the yield of acrylonitrile was 70.3%.

EXAMPLE 7

1250 g. of HNO₃ (65% by weight) are added to 2500 g. of silicic acid sol containing 30% by weight of SiO₂, and mixed with the solution described in Example 5 of 151.9 g. of Fe(NO₃)₃·9H₂O, 169.5 g. of Bi(NO₃)₃·5H₂O, 157.3 g. of (NH₄)₆Mo₇O₂₄·H₂O, 9.3 g. of NH₄H₂PO₄ and nitric acid at 25° C. The resulting clear solution gels after about 2 hours but remains clear and capable of being pumped. A catalyst prepared from this solution in a spray granulator and heated at 700° C. for 4 hours was tested as in Example 1(b). The yield of acrylonitrile obtained with a carbon charge of 20 g. per 720 ml. of catalyst was 72.3%.

EXAMPLE 8

316 g. of (NH₄)₆Mo₇O₂₄·4H₂O are dissolved in a boiling solution of 300 g. of citric acid in 300 ml. of water. 339 g. of Bi(NO₃)₃·5H₂O, 304 g. of Fe(NO₃)₃·9H₂O and 22 g. of (NH₄)₂HPO₄ are dissolved in a mixture of 50 ml. of water and 50 ml. of HNO₃ (65% by weight) at 80° C.

The two solutions are poured together and diluted with water to about 2000 ml. 1500 g. of silica gel having a specific surface area of 250 m.²g. are impregnated with this clear solution, dried at 120° C. and then heated for 4 hours at 700° C. The test carried out as in Example 1(b) showed acrylonitrile yields of 69.8% with a carbon charge of 20 g. per 720 ml. of catalyst.

EXAMPLE 9

1000 g. of the catalyst described in Example 3, containing bismuth, molybdenum and phosphorus as active substances, are impregnated with a solution prepared from 217 g. of Fe(NO₃)₃·9H₂O, 10 g. of oxalic acid and 375 ml. of water, dried at 120° C. and heated at 670 to 680° C. for 1 to 1.5 hours. The specific surface area is 8 to 11 m.²/g. The catalyst is used for acrylonitrile synthesis as in Example 1(b). At a temperature of about 465° C., under a pressure at the head of the reactor of 0.4 excess atmosphere and with a molar ratio of air to propylene to ammonia of 9.5:1:1.1, the yield of acrylonitrile was 71.2%.

A catalyst of the above composition, but not containing oxalic acid, was tested by the same method as above and provided an acrylonitrile yield of 69.4%.

EXAMPLE 10

325 g. of Bi(NO₃)₃·5H₂O and 50 g. NH₄NO₃ are dissolved in 420 ml. of HNO₃ (65% by weight) at 40° C. and then poured together at 20° C. with a solution of 18 g. NH₄H₂PO₄ and 60 g. of HNO₃ (65% by weight).

300 g. of (NH₄)₆Mo₇O₂₄·4H₂O and 170 g. of oxalic acid are dissolved in 550 ml. of water at 40° C. The solution is cooled own to 20° C. and then 100 g. of HNO₃ (65% by weight) are added.

The two solutions are poured together with stirring at 20° C. This solution is mixed with 1700 g. of silicic acid sol (containing 30% by weight of SiO₂) and 320 g. of HNO₃ (65% by weight). By granulating this mixture in a spray drier at about 150° C. to 250° C. a catalyst having a particle size of 10 to 100μ is obtained. After cooling, the catalyst is impregnated with a solution prepared from 300 g. of Fe(NO₃)₃·9H₂O, 350 ml. of H₂O and 20 g. of HNO₃ (65% by weight), dried at 120° C. and heated at 670 to 700° C. for 1 to 2 hours. The specific surface area is 7 to 10 m.²/g. The catalyst is used for acrylonitrile synthesis as in Example 1(b). At a temperature of 460° C. to 470° C., under a pressure at the head of the reactor of 0.4 excess atmosphere and with a molar ratio of air to propylene to ammonia of 9.5:1:1.1, the yield of acrylonitrile was 71.2%.

Patent claims:

1. Process for preparing acrylonitrile by reacting propylene with ammonia and molecular oxygen or air which comprises
    (a) carrying out the reaction
        (i) on a supported catalyst consisting essentially of more than 50 percent by weight catalyst carrier and the oxides of bismuth, oxides of molybdenum and oxides of iron present in amounts, based on the weight of the metal of 6 to 26 percent by weight bismuth, 2 to 20 percent by weight molybdenum and 0.5 to 10 percent by weight iron, said supported catalyst having a specific surface area of from 5 to 30 square meters per gram;
        (ii) in the absence of steam as a diluent;
        (iii) at temperatures between 400° and 500° C.;
        (iv) at pressures between 1 and 4 atmospheres;
        (v) at a reaction time between 5 and 15 seconds; and
    (b) maintaining the oxygen concentration in the gaseous reaction product mixture at less than one volume percent.

2. Process of claim 1 wherein the catalyst carrier is silicon dioxide or silicon carbide.

3. Process of claim 1 wherein the catalyst has a specific surface area of 8 to 20 square meters per gram.

4. Process of claim 1 wherein the oxygen concentration in the gaseous reaction product mixture is maintained at 0.1 to 0.4 volume percent.

5. Process of claim 1 wherein the catalyst is heated at temperatures of 580° C. to 800° C., before being used for the reaction.

6. Process of claim 1 wherein the catalyst contains phosphorous oxide present in an amount of 0.1 to 1.0 percent by weight based on the weight of phosphorous.

References Cited

UNITED STATES PATENTS 3,226,422  12/1965  Sennewald et al ____ 260—465.3

FOREIGN PATENTS 1,127,350  4/1962  Germany _____ 260—465.3
1,243,175  6/1967  Germany _____ 260—465.3

JOSEPH PAUL BRUST, Primary Examiner